United States Patent [19]

Kitazawa

[11] Patent Number: 4,994,843
[45] Date of Patent: Feb. 19, 1991

[54] FOCUS INDICATING APPARATUS OF AUTOMATIC FOCUSING CAMERA

[75] Inventor: Toshiyuki Kitazawa, Tokyo, Japan

[73] Assignee: Asahi Kogaku Kogyo Kabushiki Kaisha, Tokyo, Japan

[21] Appl. No.: 397,670

[22] Filed: Aug. 23, 1989

[30] Foreign Application Priority Data

Aug. 25, 1988 [JP] Japan ............... 63-111436[U]
Aug. 25, 1988 [JP] Japan ............... 63-111437[U]
Sep. 5, 1988 [JP] Japan ............... 63-221567

[51] Int. Cl.$^5$ ............................................. G03B 13/00
[52] U.S. Cl. ................................... 354/409; 354/474
[58] Field of Search ............... 354/409, 474, 465, 467, 354/471, 402, 403, 408

[56] References Cited

U.S. PATENT DOCUMENTS

| | | | |
|---|---|---|---|
| 4,338,596 | 7/1982 | Huber et al. | 340/636 |
| 4,348,096 | 9/1982 | Katsuma et al. | 354/289 |
| 4,436,397 | 3/1984 | Kobayashi | 354/465 |
| 4,443,086 | 4/1984 | Hosoe et al. | 354/409 |
| 4,512,646 | 4/1985 | Kitaura et al. | 354/409 |
| 4,534,636 | 8/1985 | Sugawara | 354/403 |
| 4,614,975 | 9/1986 | Kaite | 354/402 |
| 4,627,700 | 12/1986 | Nakamura et al. | 354/409 |
| 4,827,303 | 5/1989 | Tsuboi | 354/409 |
| 4,857,720 | 8/1989 | Karasaki | 354/408 |

FOREIGN PATENT DOCUMENTS 3803305 8/1988 Fed. Rep. of Germany .
63-88513 4/1988 Japan .
63-91645 4/1988 Japan .

Primary Examiner—L. T. Hix
Assistant Examiner—David M. Gray
Attorney, Agent, or Firm—Sandler, Greenblum & Bernstein

[57] ABSTRACT

A focus indicating apparatus for an automatic focusing camera includes a plurality of object distance measuring areas and an object distance measuring device for detecting the amount of defocus of an object in the object distance measuring areas. A focusing mechanism is provided for selecting the object distance measuring area, including an object to be focused, in accordance with the object distance data or defocus data detected by the object distance measuring device. A predetermined algorithm is utilized to effect focusing for the object in the selected object distance measuring area. Further included are a plurality of indicators corresponding to the object distance measuring area and an indication control for driving the indicators corresponding to the selected object distance measuring area.

59 Claims, 15 Drawing Sheets

FOCUS INDICATING APPARATUS OF AUTOMATIC FOCUSING CAMERA

BACKGROUND OF THE INVENTION

1. Field of the Invention

The present invention relates to a focus indicating apparatus of an automatic focusing camera having a plurality of object distance measuring zones.

2. Description of Related Art

Recently, an automatic focusing camera having a multi-point object distance measuring device which can detect different object distances of a plurality of objects has been developed and is available on the market.

In a known automatic focusing camera having such a multi-point object distance measuring device, usually, object distances of objects in a plurality of measuring zones (areas) or the amount of defocus of a photographing lens for the objects in their measuring zones are measured, so that a main object is judged in accordance with object distance data for the measuring zones or defocus data and an algorithm peculiar to the associated camera to indicate "out of focus" or "in focus" of the main object in a finder.

However, in the conventional multi-point object distance measuring device the indication of "out of focus" and "in focus" is effected by the same indicating means, in spite of a plurality of measuring areas. Accordingly, a photographer cannot identify the main object which is selected by the algorithm and has an uneasy feeling and may take a picture of a wrong object.

Furthermore, since the main object is automatically selected, it is impossible for a photographer to take a special picture of other than the main object.

SUMMARY OF THE INVENTION

The primary object of the present invention is to provide an indicating apparatus which has a function of indicating a measuring area automatically selected from a plurality of measuring areas, so that a photographer can identify an object which is "in focus" in the selected measuring area.

To achieve the object mentioned above, according to the present invention, in an automatic focusing camera having a plurality of measuring areas, a plurality of indicating means corresponding to the measuring areas are provided, so that the indicating means corresponding to the selected measuring area indicates the selection of an area "to be in focus".

With this arrangement, a photographer can easily identify an object in a specific measuring area.

Another object of the present invention is to provide an object distance measuring device and an indicating apparatus, in which a photographer can select an optional measuring area among a plurality of measuring areas and can easily learn from the selected measuring area whether the object is "in focus".

To achieve the object mentioned above, an apparatus according to the present invention has a plurality of indicating means corresponding to the measuring areas, a measuring area selecting means for selecting an optional measuring area by an external operation, and an indication control means for driving an indicating element corresponding to the measuring area selected by the measuring area selecting means.

With this arrangement, a photographer can optionally select a desired measuring area and can certainly learn the selected measuring area and the state of focus of the object in the selected measuring area.

Preferably, an indication control means is provided, in which the indicating means corresponding to the selected measuring area is driven in a first mode, the indicating means is driven in a second mode when "in focus" is detected by a focus judging means, and the indicating means is driven in a third mode when "out of focus" is detected by the focus judging means.

By the provision of the indicating means which is driven in three kinds of modes, a single indicating element can indicate three states.

The indicating means can be formed as an optical indicating element or as an acoustic element.

In a preferred embodiment, the indication control means turns on and off the indicating element corresponding to the measuring area selected by the measuring area selecting means at a first frequency, and continuously turns on the indicating element when the object is "in focus", and turns on and off the indicating element at a second frequency.

It is also possible to provide acoustic elements which are driven to audibly indicate the state of focus.

The indication control means can turn the indicating element off when "out of focus" is detected by the focus judging means to differentiate it from other states of focus.

It is necessary to provide a switch in order to select a desired measuring area from a plurality of measuring areas. However, a recent single-lens reflex camera has many switches for selecting many functions, and accordingly, the provision of such an additional switch is not preferable in operation and in function.

The inventors of the present invention have observed that two operating members are usually actuated in combination to select photographing modes in a recent single-lens reflex camera, and that one of the operating members is idle (inoperative) after a specific photographing mode is selected, i.e., that operating member does not function even if actuated. The inventors have conceived that the idle operating member can be and should be used to select the measuring areas of the multi-point object distance measuring camera.

Namely, in a multi-point object distance measuring camera having a plurality of object distance measuring areas and a focusing means for an object in a specific measuring area selected from the measuring areas, in which photographing modes, such as "program", "shutter priority auto", "diaphragm priority auto", "manual", etc. are set by the combination of a mode selecting member and a switching member, so that a manual setting of photographing data, such as a shutter speed is effected by a single operation of the switching member, according to the present invention, an object distance area selecting means is provided for selecting an optional object distance measuring area among the object distance measuring areas by the single operation of the switching member when a mode other than the specific photographing mode(s) is selected, whereby the selection of the object distance measuring areas can be effected by the operation of the switching member.

According to another aspect of the present invention, to select the object distance measuring areas using the same switching member even at the specific photographing mode(s), the object distance area selecting means has an additional function of storing the photographing mode set by the switching member only when the mode selecting member is actuated at the selected specific mode, whereby the object distance measuring area can be selected by the single operation of the switching member thereafter.

The object distance measuring area selecting means not only makes the selection of the measuring areas by the switching member impossible, but can also set photographing data, by the operation of the mode selecting member after the measuring areas are selected.

Preferably, object distance measuring frames corresponding to the object distance measuring areas are provided in the finder field of view. In this case, preferably the indicating elements are located at positions corresponding to the respective object distance measuring frames, i.e., at positions at which a photographer can easily recognize a certain relationship to the object distance measuring areas at a glance.

Preferably, the direction of operation of the switching member is identical to the orientation of the arrangement of the object distance measuring areas, from the viewpoint of operability.

Preferably, the selection of object distance measuring areas can be effected only when an object distance measuring area selecting mode is selected by a separate object distance measuring mode switch. When the measuring area selecting mode is not selected, the object distance measuring area is selected in accordance with an algorithm peculiar to the camera, so that the object in the selected measuring area is "in focus". In this case, it is possible to give information on the selected measuring area to a photographer by the indicating element provided in the finder field of view.

BRIEF DESCRIPTION OF THE DRAWINGS

The invention will be described below in detail with reference to the accompanying drawings, in which.

DESCRIPTION OF PREFERRED EMBODIMENTS

Figure 1:
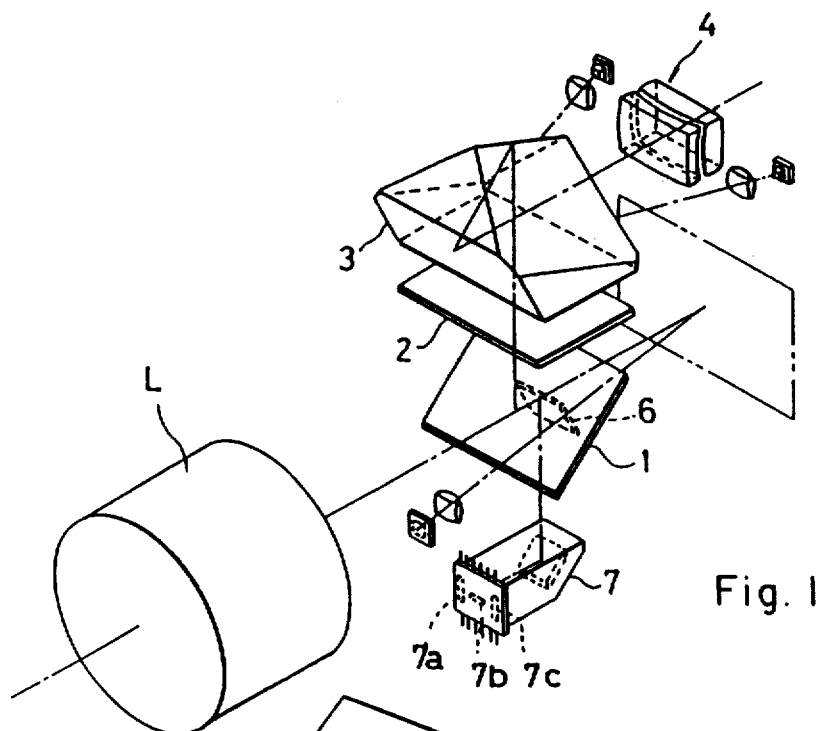
FIGS. 1 and 2 are schematic views of an optical system of a camera having a focus indicating apparatus according to the present invention.
Figure 2:
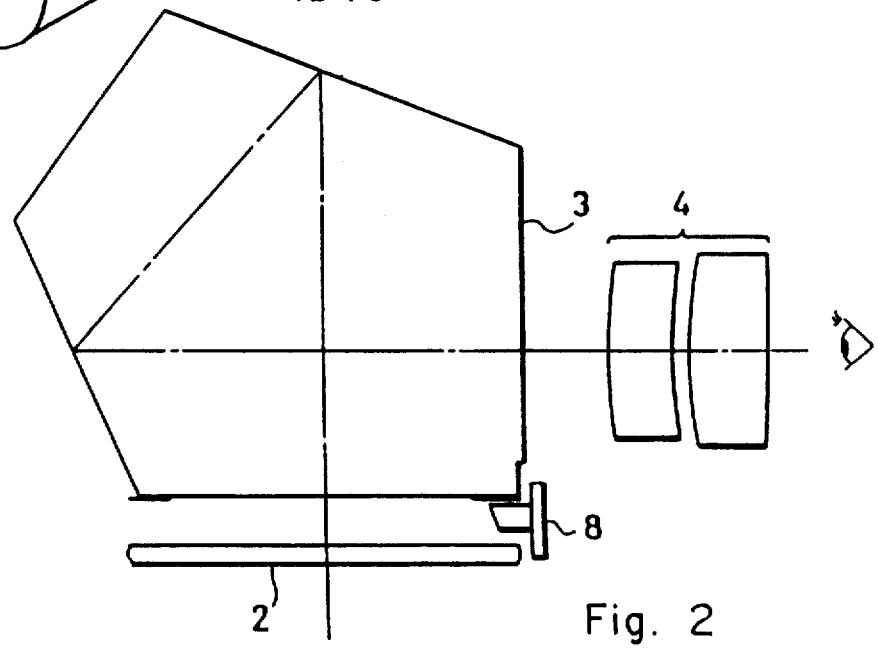

In FIGS. 1 and 2 which show an optical arrangement of a single-lens reflex camera to which the present invention is applied, a luminous flux of an object incident upon the camera through a photographing lens L is reflected by a first mirror 1 upward toward a pentagonal prism 3 and is partly transmitted through the first mirror 1. The luminous flux reflected by the first mirror 1 is transmitted through a focusing screen 2 and is then reflected by the pentagonal prism 3. After that, the luminous flux is incident on the photographer's eyes through eye-pieces 4. On the other hand, the luminous flux transmitted through the first mirror 1 is reflected downward by a sub mirror 6 and then reaches an object distance measuring module 7 provided on the bottom of a mirror box.

The the distance measuring module 7 detects object distances of objects in a plurality of object distance measuring areas (three areas in the illustrated embodiment). Numerals 7a, 7b and 7c designate object distance measuring sensors upon which the luminous fluxes of the corresponding object distance measuring areas are incident. The positions of the object distance measuring areas in the finder field of view 20 are designated at 20a, 20b and 20c in FIGS. 5A–5D, respectively. In the illustrated embodiment, although the object distance measuring areas 20a, 20b and 20c are arranged in a form of H, the arrangement and the number of the object distance measuring areas are not limited thereto. Note that the object distance measuring areas 20a, 20b and 20c in the finder field of view 20 are usually visualized by the object distance measuring frames.

The object distance measuring device in the illustrated embodiment is of a phase difference detecting system which is widely used as a distance measuring means. Accordingly, in the illustrated embodiment, an aerial image of an object in each of the object distance measuring areas 20a, 20b and 20c is divided into two images which are formed on the respective object distance measuring sensor 7a, 7b or 7c. The phase differences of the divided images focused on the respective object distance measuring sensors are detected to perform a predetermined arithmetic operation (predictor arithmetic operation) based on the detected phase differences, thereby to detect the amount of defocus (vector value). Although the focusing operation is effected by the measurement of the defocus value in the illustrated embodiment as mentioned above, the object distance can be used to perform the focusing operation, and accordingly, the expression "object distance measuring" referred to in the present specification includes both the defocus measurement and the object distance measurement.

Between the focusing screen 2 and the pentagonal prism 3 is provided a focus information indicating member 8 which indicates the focus data of the object distance measuring areas 20a, 20b and 20c, as shown in FIG. 2. The indicating member 8 has indicating elements 8a, 8b and 8c corresponding to the object distance measuring areas 20a, 20b and 20c. The indicating elements 8a, 8b and 8c are made of optical elements, such as LED or LCD(LED's are used in the illustrated embodiment).

Figure 3A:
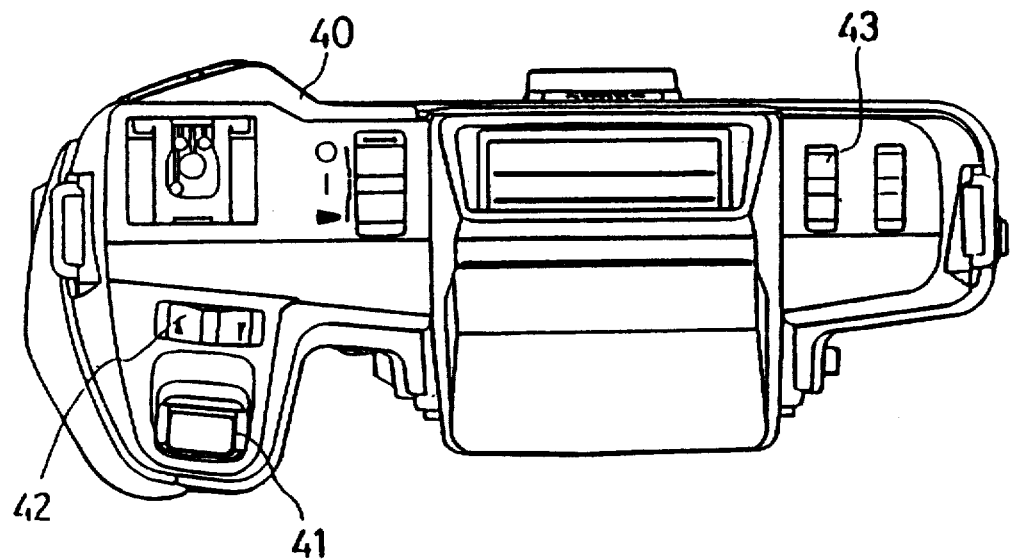
FIGS. 3A and 3B are plan view and front elevational view of a camera having a focus indicating apparatus according to the present invention, respectively.
Figure 3B:
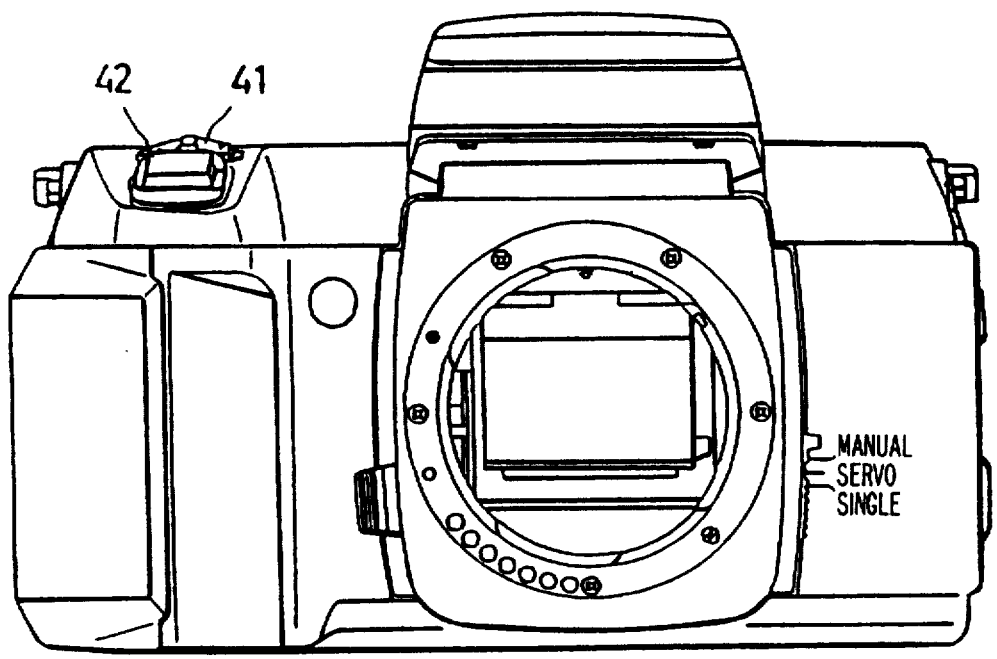

FIGS. 3A and 3B show an appearance of a single-lens reflex camera according to the present invention. A shutter button 41 which starts the release operation is provided on the upper front portion on the left side of a camera body 40, as viewed from front. The shutter button 41 serves as a measurement starting switch when it is pushed down by a half step and a release starting switch when fully pushed down. Namely, the shutter button 41 forms an object distance measuring switch 9 and a release switch.

An object distance measuring area selecting switch (switching member) 42 for selecting the measuring area 20a, 20b or 20c to be used for focusing operation by an external operation is located in front of the shutter button 41 (closer to a photographer), so that the selecting switch 42 slides to select the measuring areas 20a, 20b or 20c. Preferably, the selecting switch 42 is actuated by combined operation of the mode switch 43 to prevent malfunction.

In a single-lens reflex camera according to the present invention, normally, a main object is judged based on the distance signals from the measuring areas 20a, 20b and 20c, in accordance with the camera's own algorithm, so that focusing is effected for the measuring area in which the main object is included. Furthermore, the cooperation of the object distance measuring area selecting switch 42 and the mode switch 43 makes it possible to select an optional measuring area 20a, 20b or 20c. Namely, focusing can be effected for an object included in a selected object distance measuring area.

Figure 4:
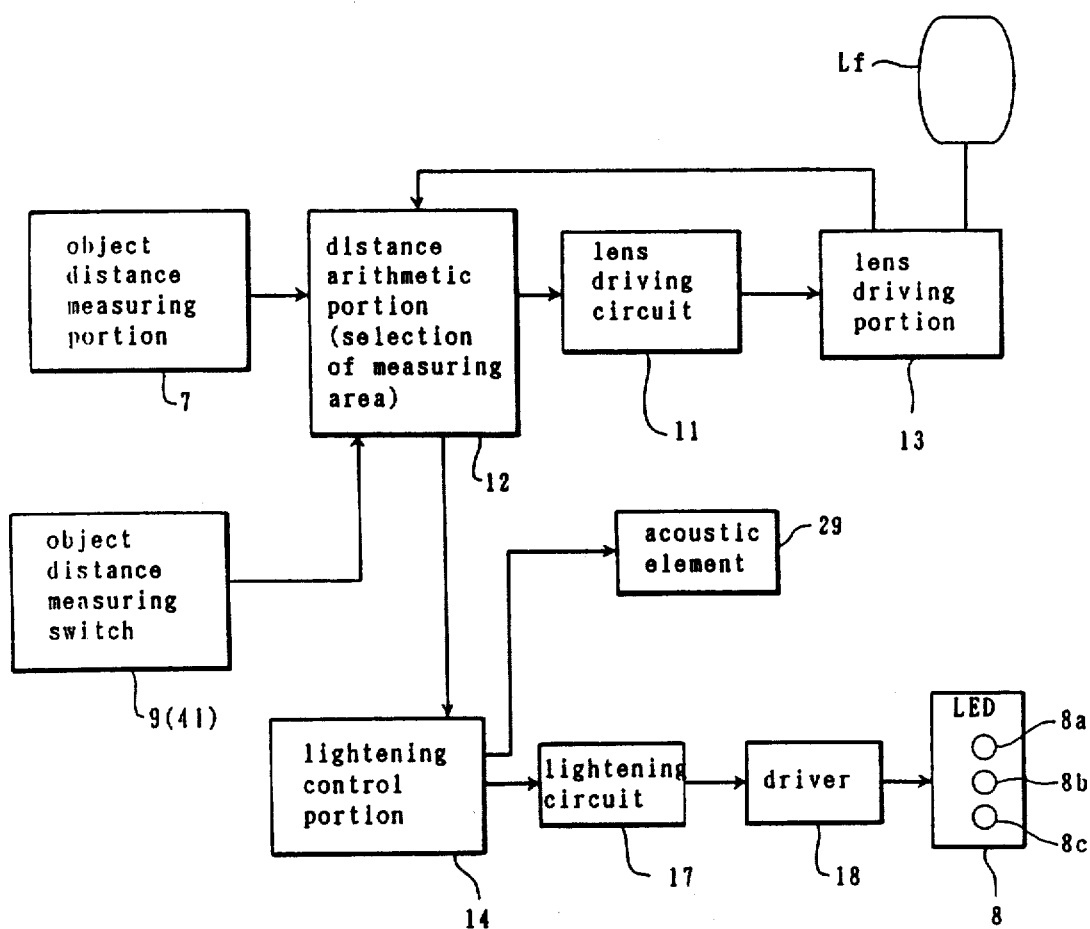
FIG. 4 is a block diagram of a focus indicating apparatus of a camera, according to an aspect of the present invention.

The following discussion will be directed to how the selected object distance measuring area can be recognized by a photographer. FIG. 4 shows a block diagram of a focus indicating apparatus according to the present invention.

In FIG. 4, the object distance measuring portion 7 which corresponds to the object distance measuring module 7 in FIG. 1 has three object distance measuring sensors 7a, 7b and 7c which measure the defocus value with respect to the objects in the three object distance measuring areas 20a, 20b and 20c. The object distance measuring portion 7 is connected to a distance arithmetic portion 12 which controls the operation of the object distance measuring portion 7, so that the object distance measuring sensors 7a, 7b and 7c are actuated to output the distance signals.

The distance arithmetic portion 12 functions as a control means of the object distance measuring portion 7, as mentioned above and also has an arithmetic operational function for obtaining the defocus value based on the distance signals, a selection function for selecting the object distance measuring area to be focused and a control function for controlling the lens driving circuit 11 in accordance with the defocus value. The arithmetic portion 12 is usually composed of a micro computer.

The lens driving circuit 11 is connected to a lens driving portion 13 which drives a focus lens Lf and which moves the focus lens Lf in the optical axis direction until focusing is completed in accordance with the drive signal issued from the arithmetic portion 12. The data on the displacement of the lens driving portion 13 is fed back to the distance arithmetic portion 12, so that the latter stops the drive of the focus lens Lf in accordance with the defocus value. That is, the distance arithmetic portion 12 detects the amount of drive of the lens driving portion 13 in accordance with the defocus value, so that when the data of the amount of drive fed back from the lens driving portion 13 is identical to the detected value, the lens driving portion 13 stops operating.

The distance arithmetic portion 12 is connected to an object distance measuring switch 9 which is turned on when the shutter button 41 is pushed down by a half step. The distance arithmetic portion 12 drives the distance measuring portion 7 when the measuring switch 9 is turned ON to detect the defocus values based on the distance signals for the three object distance measuring areas 20a, 20b and 20c, supplied from the distance measuring portion 7. Based on the defocus values, the object distance measuring area 20a, 20b or 20c to be used, that is, the object to be focused is selected in accordance with a predetermined algorithm of the camera.

As an algorithm for the election of the focusing areas is known, a brief example is given: In a first mode the focusing is effected for an object distance measuring area including an object at the closest distance. In a second mode all the object distance measuring areas are included to provide maximum depth of field. In another mode the closest object and the object closest to the closest object are included to provide depth of field. The subject of the present invention is not directed to the form of such an algorithm and is not limited to the above mentioned examples.

The distance arithmetic portion 12 is connected to a light control portion 14 which control the illumination of the focus information indicating member 8. The light control portion 14 makes the indicating elements 8a, 8b and 8c ON through a light circuit 17 and a driver 18 in accordance with the object distance measuring area selection signals issued from the distance arithmetic portion 12. Although the distance arithmetic portion 12 and the light control portion 14 are represented by separate blocks independent from each other in FIG. 4, these can be constituted for example by a single CPU.

Figure 5A:
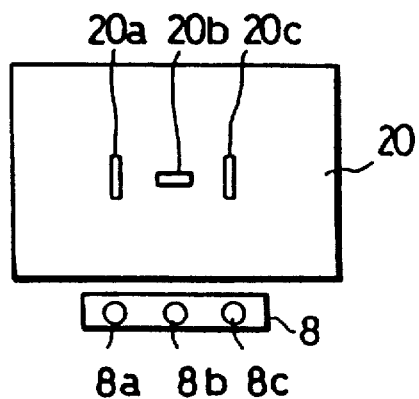
FIGS. 5A through 5D are explanatory views showing operations of a focus indicating apparatus according to the present invention, by way of an example.

The focus information indicating member 8 is placed so that when a photographer views through the finder, it appears below the finder field of view 20, as shown in FIG. 5A. The indicating elements 8a, 8b and 8c are located directly below the respective object distance measuring areas 20a, 20b and 20c.

Figure 6:
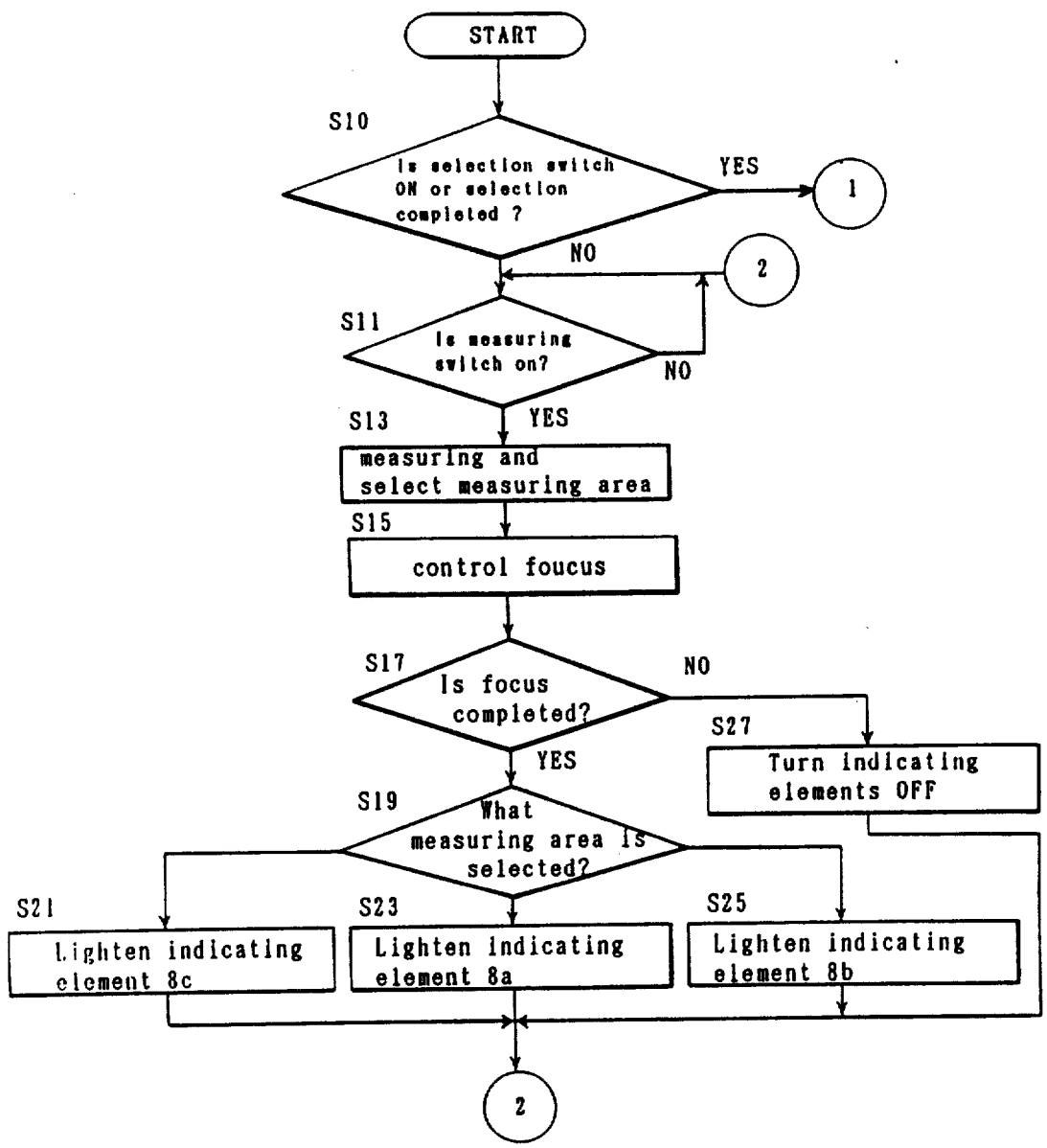
FIG. 6 is a flow chart of operations of a focus indicating apparatus of a camera according to the present invention.

The focus indicating apparatus as constructed above operates as follows (FIG. 6). Note that the operation is performed by the distance arithmetic portion 12 in accordance with the program stored therein.

When the program starts, whether the measuring area selecting portion 21 is operated by the slide movement of the measuring area selecting switch 42, or whether the measuring area is selected by the operation of the measuring area selecting portion 21 are checked at step 10. If the measuring area selection portion 21 is operated, or selection is made, the control jumps to step S35 of FIG. 9. On the contrary, if measuring area selecting portion 21 is not operated and selection is not made, the control proceeds to step S11.

At step S11, whether the distance measuring switch 42 is operated is checked. If the distance measuring switch 42 is operated when the shutter button 41 is pushed down by a half step by a photographer, the ON signal is input to the distance arithmetic portion 12 which then drives the distance measuring portion 7 to detect the defocus values based on the distance signals for the three measuring areas 20a, 20b and 20c output from the object distance measuring sensors 7a, 7b and 7c of the distance measuring portion 7, so that one of the measuring areas 20a, 20b and 20c is selected based on the algorithm in accordance with the defocus values (step S13).

After that, the direction and the amount of drive of the lens driving portion 13 are detected to complete the focusing on the object in the selected measuring area 20a, 20b or 20c, so that the lens driving portion 13 is driven by the lens driving circuit 11 in accordance with the detection (arithmetic value) to move the focus lens Lf thereby to control the focus (step S15).

Upon the completion of focusing, the distance arithmetic portion 12 sends light signals to the light control portion 14 to lightening the indicating element 8a, 8b or 8c of the selected distance measuring area 20a, 20b or 20c, so that the light control portion 14 lights the indicating element 8a, 8b or 8c corresponding to the selected distance measuring area 20a, 20b or 20c through the lighting lightening circuit 17 and the driver 18 (steps S17~S25).

The light control portion 14 outputs the lightening signal into the lightening circuit 14 to lighten the indicating element 8a, 8b or 8c corresponding to the selected distance measuring area in accordance with the selection signal and the focusing signal issued from the distance arithmetic portion 12, so that the driver which receives a predetermined lighting signal from the light circuit 14 lights the indicating element 8a, 8b or 8c corresponding to the focused distance measuring area 20a, 20b or 20c. For instance, when the object distance areas 20a, 20b and 20c are selected, the indicating elements 8a, 8b and 8c are turned ON, respectively.

On the other hand, if no focusing can be effected for the object distance measuring areas 20a, 20b and 20c, the distance arithmetic portion 12 issues OFF signals to the lightening control portion 14 to make OFF all of the indicating elements 8a, 8b and 8c of the focus information indicating member 8 (steps S17 and S27). After that, the control is returned to step S11 and then the above mentioned operations are repeated.

Figure 5B:
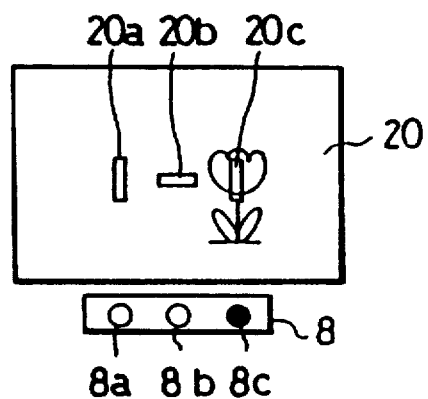
Figure 5C:
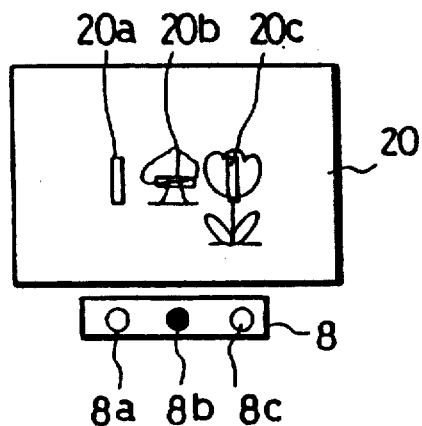
Figure 5D:
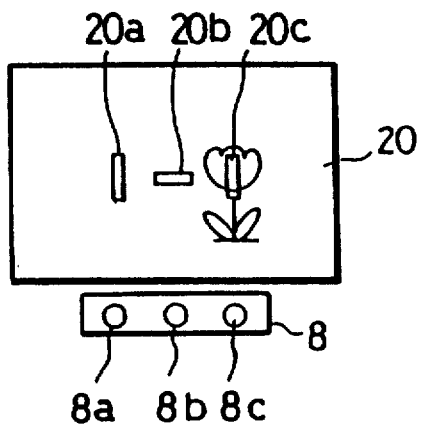

FIG. 5B shows the indicating element 8c which is made ON (lightened) when the focusing is made for the object in the measuring area 20c. In FIG. 5D, none of the indicating elements 8a, 8b and 8c lightens, since none of the objects in the measuring areas 20a, 20b and 20c is in focus.

In the illustrated embodiment, the focusing is made for one of the object distance measuring areas 20a, 20b and 20c selected by the algorithm. Alternatively, if the focusing is effected in such a way that the objects in a plurality of object distance measuring areas are included in the depth of field, it is possible to lighten the indicating elements corresponding to the object distance measuring areas included in the depth of field or the indicating element corresponding to the object distance measuring area which includes an object closest to the focused object. For example, if both the objects in the measuring areas 20a and 20b are "in focus", the indicating elements 8a and 8b are lightened, or only the indicating element 8a is lightened when the object in the measuring area 20a is closer to the focused position than the object in the measuring area 20b.

In the illustrated embodiment, although the indicating element is lightened when the object is "in focus", it is possible to turn ON and OFF the indicating element corresponding to the selected measuring area to indicate the selected measuring area, whereby the discontinuous lightening of the indicating element is changed to a continuous lightening when the focusing is completed. If no measuring or no focusing can be effected for example for the reason that the object is a white wall or the object is located closer than the shortest photographing distance, the lightening of the indicating element is turned OFF or the indicating element is made ON and OFF at a cycle different from that of the selection indication mentioned above.

As an indicating means, an acoustic element can be used alone or in combination with a proper optical indicating element. In this case, the acoustic elements work at a different tone or frequency or compound sound when focusing is completed or no focusing can be effected. In an exemplary, non-limiting embodiment, an individual acoustic indicating element can be associated with each indicating means in combination with an optical indicating element. The acoustic elements can be distinguished from each other by being provided with differing tones or frequencies. Single tones or frequencies or various combinations thereof can also be utilized as indicators.

Figure 7:
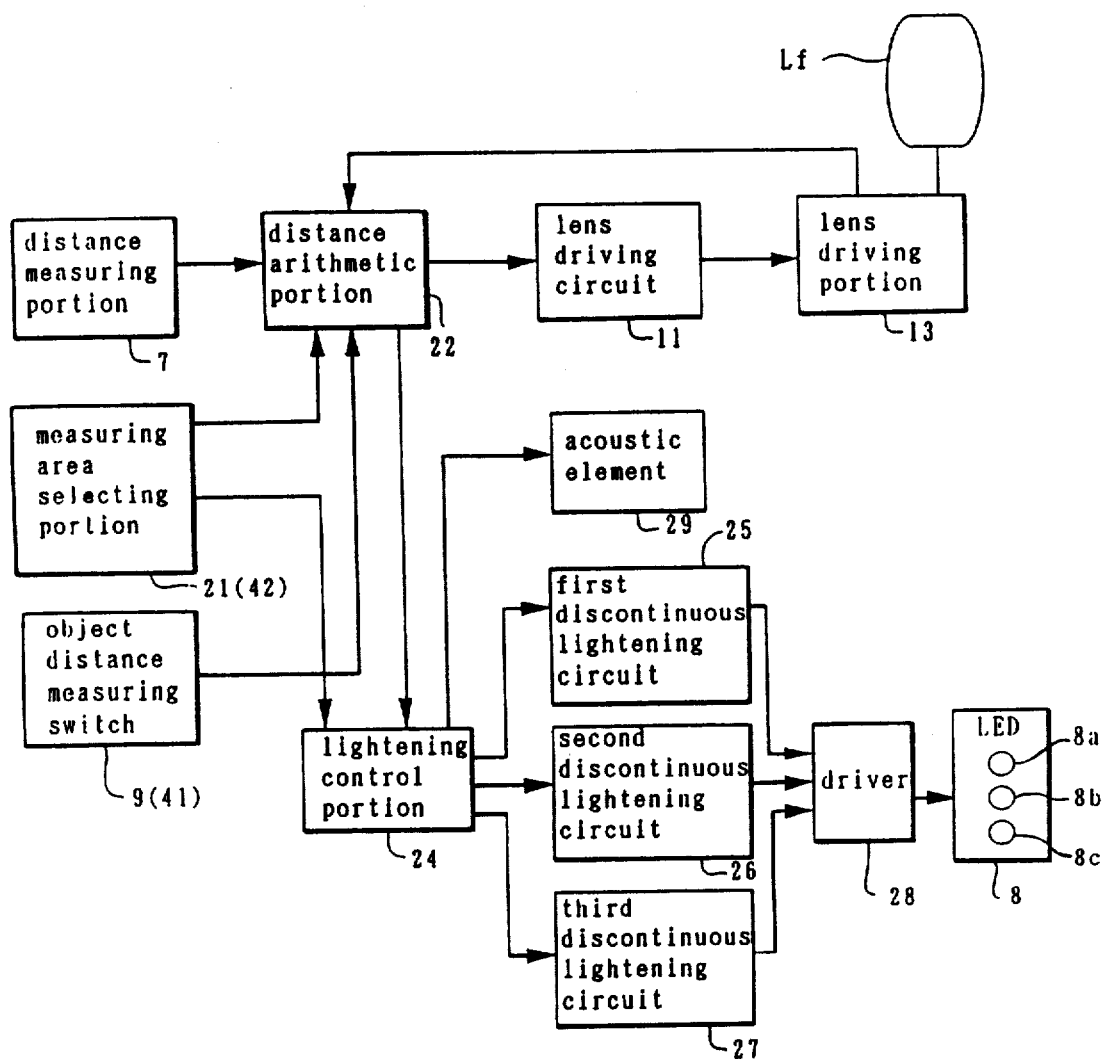
FIG. 7 is a block diagram of an object distance measuring area selecting device and a focus indicating apparatus of a camera, according to an aspect of the present invention.
Figure 8A:
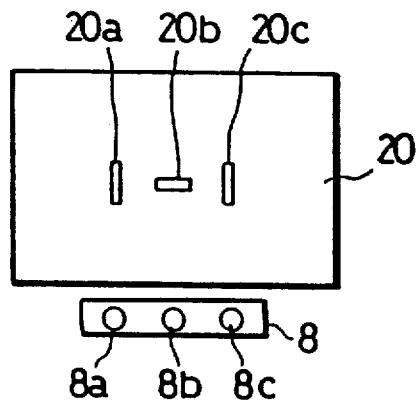
FIGS. 8A and 8D are explanatory views showing operations of a focus indicating apparatus according to another aspect of the present invention.
Figure 8B:
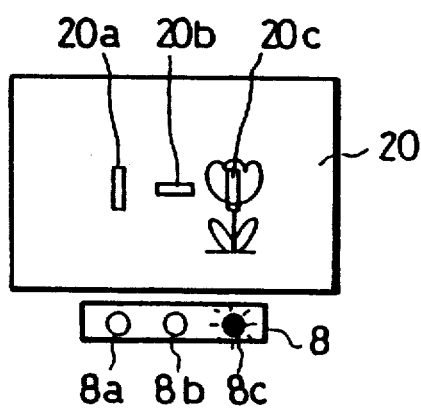
Figure 8C:
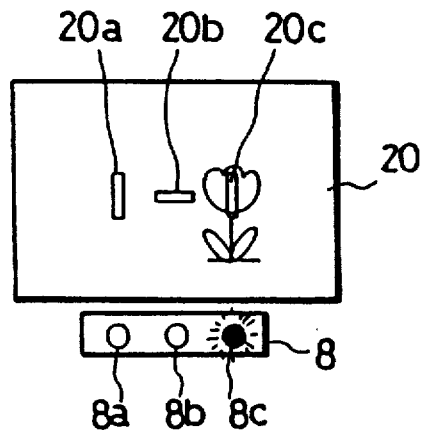
Figure 8D:
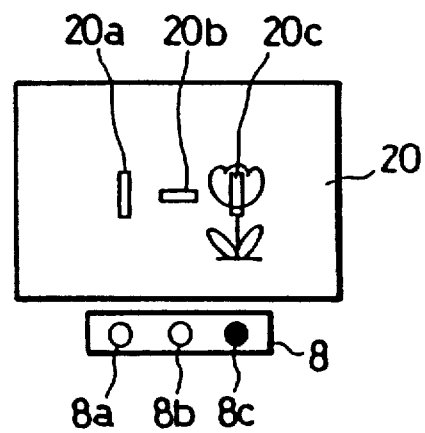
Figure 9:
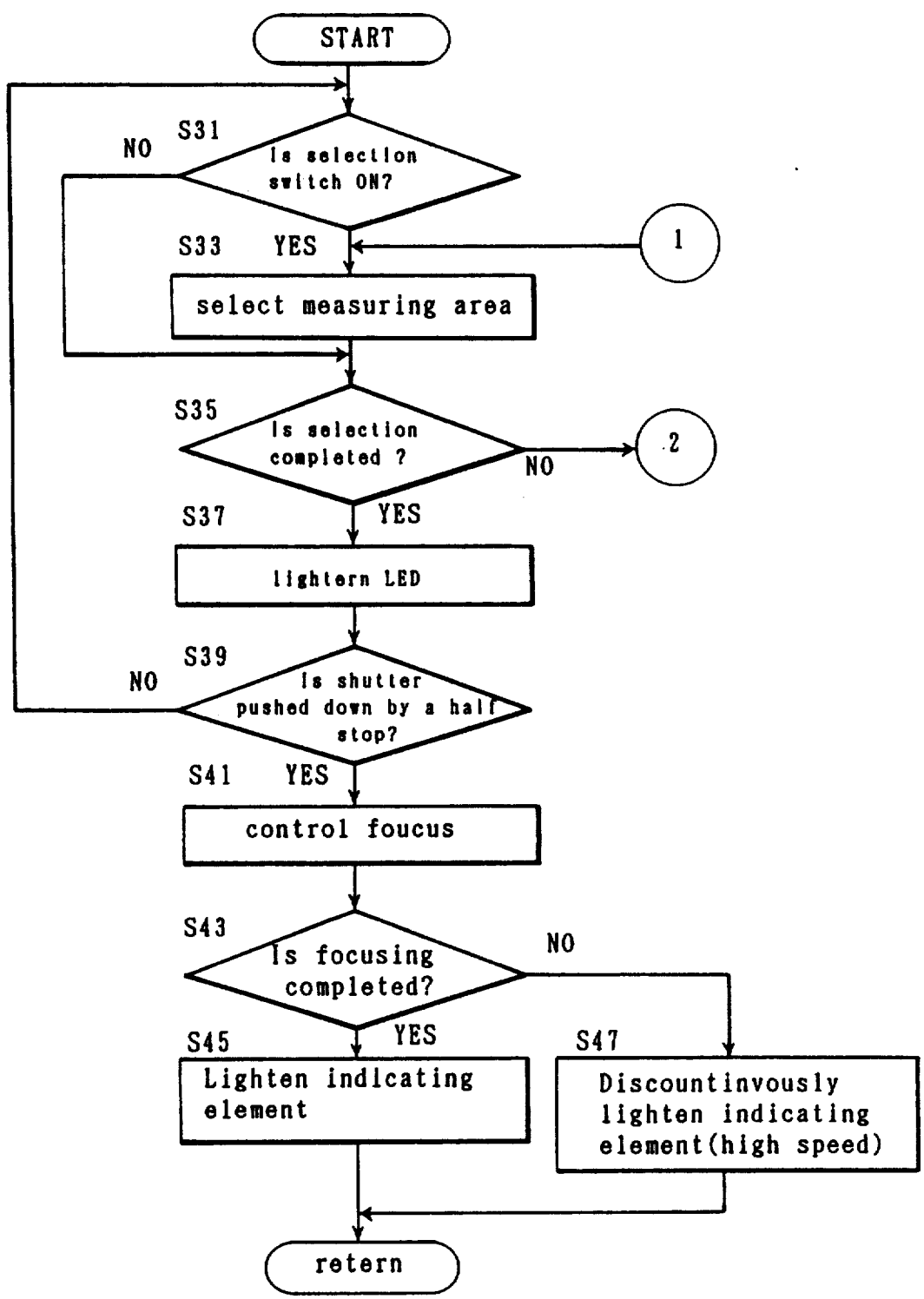
FIG. 9 is a flow chart corresponding to FIGS. 8A through 8D.

FIGS. 7 to 9 show another embodiment in which a photographer can select an optional object distance measuring area. In FIGS. 7 to 9, the components corresponding to those in FIGS. 1 to 4 are designated with the same reference numerals.

In FIG. 7, the focus control operation of the distance measuring portion 7, the distance arithmetic portion 22, the lens driving circuit 11 and the lens driving portion 13 is basically same as that of the distance measuring portion 7, the distance arithmetic portion 12, the lens driving circuit 11 and the lens driving portion 13 shown in FIG. 4.

The lightening control portion 24 selects one corresponding circuit among the first discontinuous lightening circuit 25, the second discontinuous third discontinuous lightening circuit 26 and the lightening circuit 27, in accordance with the measuring distance area selection signal issued from the measuring area selecting portion 21, and the signal indicating focus or non-focus issued by the distance arithmetic portion 22. The selected circuit 25, 26 or 27 lightens or discontinuously lightens the indicating element 8a, 8b or 8c through the driver 28. The first discontinuous lightening circuit 25 and the second discontinuous lightening circuit 26 lighten the indicating elements 8a, 8b and 8c at different cycles. The lightening circuit 27 continuously lightens the indicating elements 8a, 8b and 8c. As can be seen in FIG. 8A, the focus information indicating member 8 appears below the finder field of view 20 (FIG. 5A), and the indicating element 8a, 8b and 8c are located below three measuring areas 20a, 20b and 20c.

The measuring area selecting portion 21 has a measuring area selecting switch 42, so that it outputs the measuring area selection signal to the distance arithmetic portion 22 and the lightening control portion 24. When the measuring area selecting signal is output, the distance arithmetic portion 22 modifies and selects one measuring area to be used. The lightening control portion 24 lightens the indicating element 8a, 8b or 8c corresponding to the selected distance measuring area through the lightening circuit 27.

According to the present invention, when no measuring area is selected by a photographer, the object distance is measured using all the measuring areas 20a, 20b and 20c, similar to the embodiment shown in FIGS. 4 and 6, so that the measuring area 20a, 20b or 20c to be used for focusing is selected by the predetermined algorithm to effect the focus control and lightening control of the indicating member 8. On the other hand, if one measuring area 20a, 20b or 20c is selected by photographer, the measurement of the object distance, the control of focus and the control of lightening are effected for the selected measuring area.

The operation of the illustated embodiment will be explained below with reference to FIG. 9.

When the program starts, whether or not the measuring area selecting portion 21 is operated by the slide movement of the measuring area selecting switch 42 is checked at step S31. If the measuring area selecting portion 21 is operated, the measuring area selecting operation is effected to select the measuring area at step 33. After that, the control proceeds to step S35. If no measuring area selecting portion 21 is operated, the control jumps to step S35.

At step S35, whether the measuring area is selected by the operation of the measuring area selecting portion 21 is checked. If no selection is made, the control jumps to step S11 of FIG. 6. On the contrary, if selection is made, the indicating element corresponding to the selected measuring area is lightened by the first discontinuous lightening circuit 25 in the first form (step S37). For instance, as shown in FIG. 8B, when a photographer selects the measuring area 20c, the corresponding indicating element 8c is discontinuously lightened at a predetermined cycle, e.g. 2-3 Hz.

After that, whether the shutter button 41 is pushed down by a half step, namely whether the measuring switch 9 is turned ON is checked. If the measuring switch 9 is not ON, the control is returned to step S31 and the operations are repeated until the measuring switch 9 is ON. If the measuring switch 9 is ON, the control proceeds to step S41.

When the measuring switch 9 is ON, the measurement starting signal is input to the distance arithmetic portion 12 which effects the focus control (step S43). Namely, to bring the object appearing in the selected measuring area 20a, 20b or 20c in focus, the defocus value and the displacement of the lens are detected in accordance with the distance signals from the corresponding object distance measuring sensor 7a, 7b or 7c, whereby the focus lens Lf is driven through the lens driving circuit 11 and the lens driving portion 13 in accordance with the displacement of the lens thus obtained.

The distance arithmetic portion 22 sends the focus signal to the lightening control portion 24. If the signal represents "non-focus (impossibility of focusing)" or "out of focus", the lighting control portion 24 selects the second discontinuous light circuit 26, so that the indicating element 8a, 8b or 8c corresponding to the selected distance measuring area 20a, 20b or 20c is discontinuously lightened at a frequency different from that of the focusing area selection (first form), e.g. at a longer cycle (second form). For instance, as shown in FIG. 8c, in case of non-focus, the indicating element 8c corresponding to the selected measuring area 20c is turned ON and OFF at about 10 Hz (step S47).

On the other hand, if the signal represents the completion of focusing, the lighening control portion 24 selects the lightening circuit 27 to lighten the indicating elememt 8a, 8b or 8c corresponding to the selected measuring area 20a, 20b or 20c in the third form different from the first and the second forms. For example, as shown in FIG. 8D, if the signal represents "in focus", the indicating element 8c correponding to the selected distance measuring area 20c is continuously lightened (step S45).

As can be understood from the foregoing, according to the modified embodiment, the indicating element corresponding to the object distance measuring area selected by the measuring area selecting portion 20 is turned ON and OFF at a relatively short cycle (first form), so that a photographer can learn the selected measuring area. When the object is "in focus", the indicating element is continuously lightened (second form). When focusing can not be effected (non-focus), the indicating element is turned ON and OFF at a relatively long cycle (third form). Thus, a photographer can confirm the object distance measuring area selected by himself or herself through the finder and also can recognize the state of focus ("in focus", "non-focus").

When no focusing can be effected, the indicating elements may be made OFF to indicate non-focus.

Although the object distance measuring area selected by a photographer and the state of focus in the selected object distance measuring area are indicated by the indicating elements (light emitting elements) in the illustrated embodiment, the invention is not limited thereto. For example, a photographer can recognize the selected measuring area and the state of focus therein with the help of acoustic elements 29 having different frequencies of sound or different cycles of generation of sound or of compound sounds. Alternatively, it is also possible to use both the optical elements 8 and the acoustic elements 29 in combination.

The following explanation will be directed to an embodiment applied to a camera which has a plurality of selectable photographing modes.

Figure 11A:
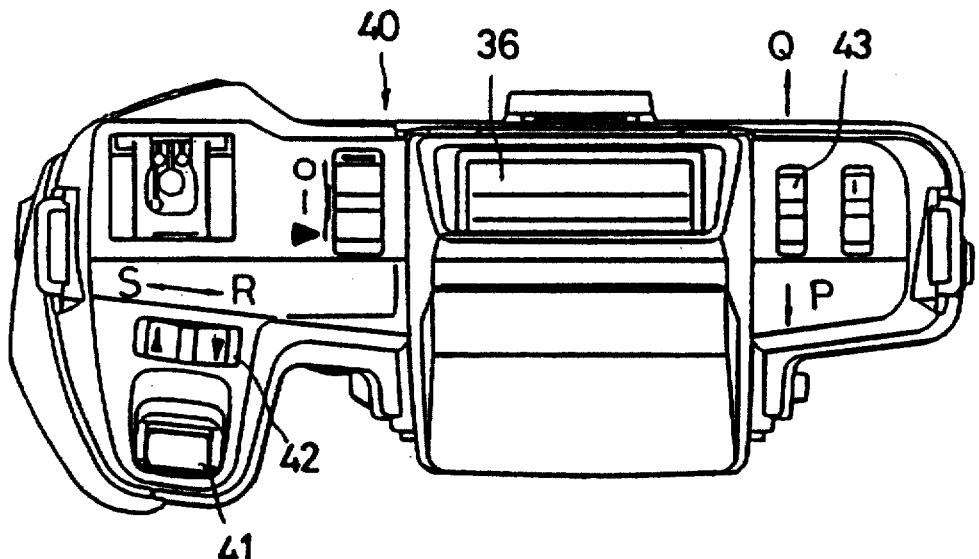
FIGS. 11A and 11B are plan view and front elevational view of a single-lens reflex camera to which the present invention is applied.
Figure 11B:
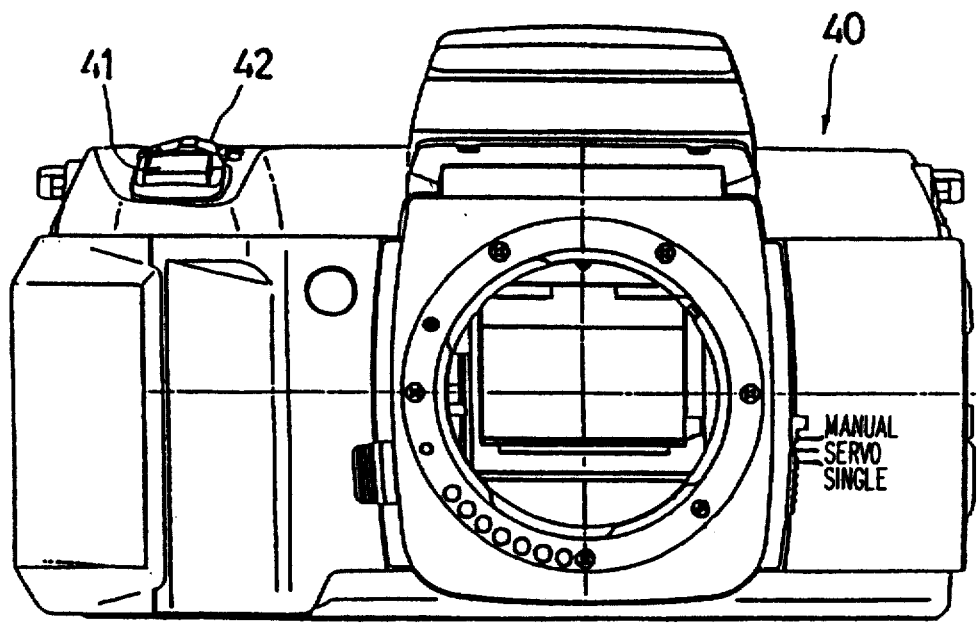

In FIGS. 11A and 11B which show a multi-point object distance measuring camera, a mode switch 43 which serves as a mode selecting member is provided on the upper surface of the camera body 40 on the opposite side to the release button 41. A switch (object distance measuring area selecting switch) 42 which constitutes a switching member 34 is located in front of the release button 41 to be closer to a photographer. The mode switch 43 is slidable in the directions P and Q in FIG. 11A. The switch 42 is slidable in the directions R and S in FIG. 11A.

In this type of camera, when a photographing mode is changed, a photographer slides the mode switch 43 in the direction P (direction of mode selection) and slides the switch 42 in the direction R or S while holding the mode switch 43. By this operation, the photographing modes are sequentially changed.

The photographing mode successively changes from "program modes (plurality)" to "shutter priority (auto) mode" in accordance with the sliding movement of the switch 42 when the diaphragm on the lens side is in an auto-mode. On the other hand, when the diaphragm on the lens side is in a manual-mode, the photographing mode successively changes from "diaphragm priority (auto) mode" to "manual mode (plurality)".

When the photographing mode is set to be "manual mode" or "shutter priority mode", the shutter speed can be set by a single operation of the switch 42.

According to an aspect of the present invention, the switch 42 is used to select the object distance measuring areas, which will be described in detail hereinafter.

When the photographing mode is set to be "program modes" and "diaphragm priority mode", the object distance measuring areas are selected by the single operation of the switch 42. On the other hand, when the photographing mode is set to be "manual mode" or "shutter priority mode", the object distance measuring areas can be selected by the single operation of the switch 42 once the mode switch 43 is slid in the direction P.

Figure 12:
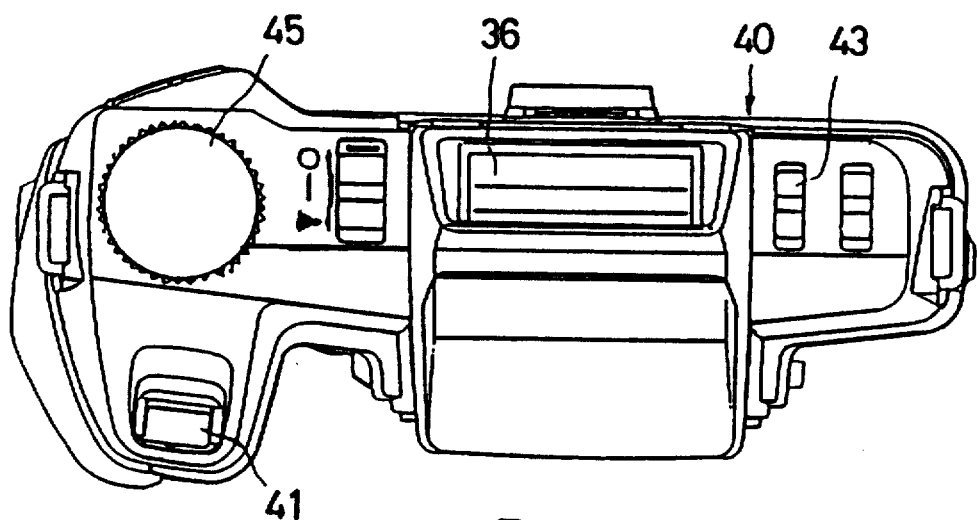
FIGS. 12 and 13 are plan views of other single-lens reflex cameras to which the present invention is applied.
Figure 13:
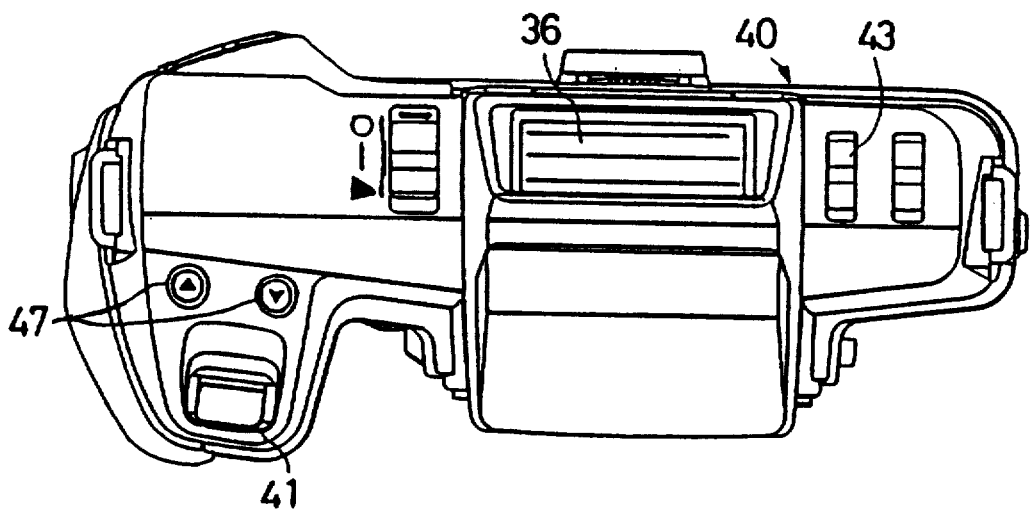

The switching portion 42 is found as a dial switch 45 in a camera shown in FIG. 12, and push buttons 47 in a camera shown in FIG. 13, respectively. The cameras shown in FIGS. 12 and 13 are similar to each other except for the type of switching portion 42.

Figure 10:
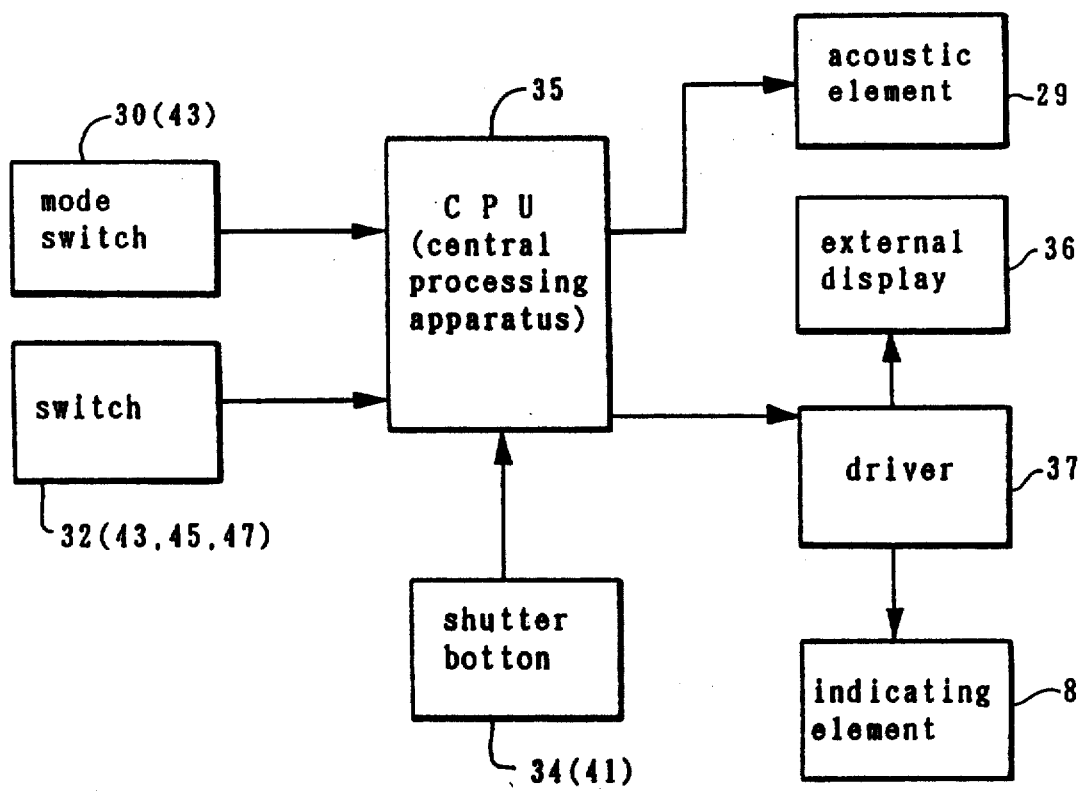
FIG. 10 is a block diagram of a control system of a camera, according to another aspect of the present invention.

FIG. 10 shows a block diagram of a control apparatus which controls a multi-point object distance measuring camera according to the present invention. Note that only the components associated with the present invention are shown in FIG. 10.

The mode switch portion 30 (43) as a mode selecting member, the switch portion 32 (42, 45, 47), and the release switch portion 34 (41) are connected to the CPU 35 as a controller, so that ON/OFF signals of the switch portions 30, 32 and 34 are input to the CPU 35. To the CPU 35 is also connected the focus information indicating member 8 mentioned above and the driver 37 which drives an external display 36.

As mentioned above, when both the mode switch portion 30 and the switch portion 32 are operated, the CPU 35 successively changes the photographing modes of the camera. When the photographing mode is the "manual mode" or the "shutter priority mode", the CPU 35 sets the shutter speed only by the operation of the switch 32. Even if the photographing mode is the "manual mode" or the "shutter priority mode", when the mode switch portion 30 is solely actuated, the CPU 35 locks the set shutter speed, so that the object distance measuring areas are selected only when the switch 32 is solely actuated thereafter. The set modes are indicated in the external display 36.

When the release button 41 is pushed by a half step, the CPU 35 commences the focus control operation to bring the object included in the measuring area 20a, 20b or 20c selected by the switch portion 32 in focus. Then, the indicating element 8a, 8b or 8c corresponding to the selected measuring area 20a, 20b or 20c is first turned ON and OFF and is then continuously lightened or discontinuously lightened at a different cycle. Namely, the indicating element 8a, 8b or 8c corresponding to the selected measuring area 20a, 20b or 20c is continuously or discontinuously lightened.

Figure 14A:
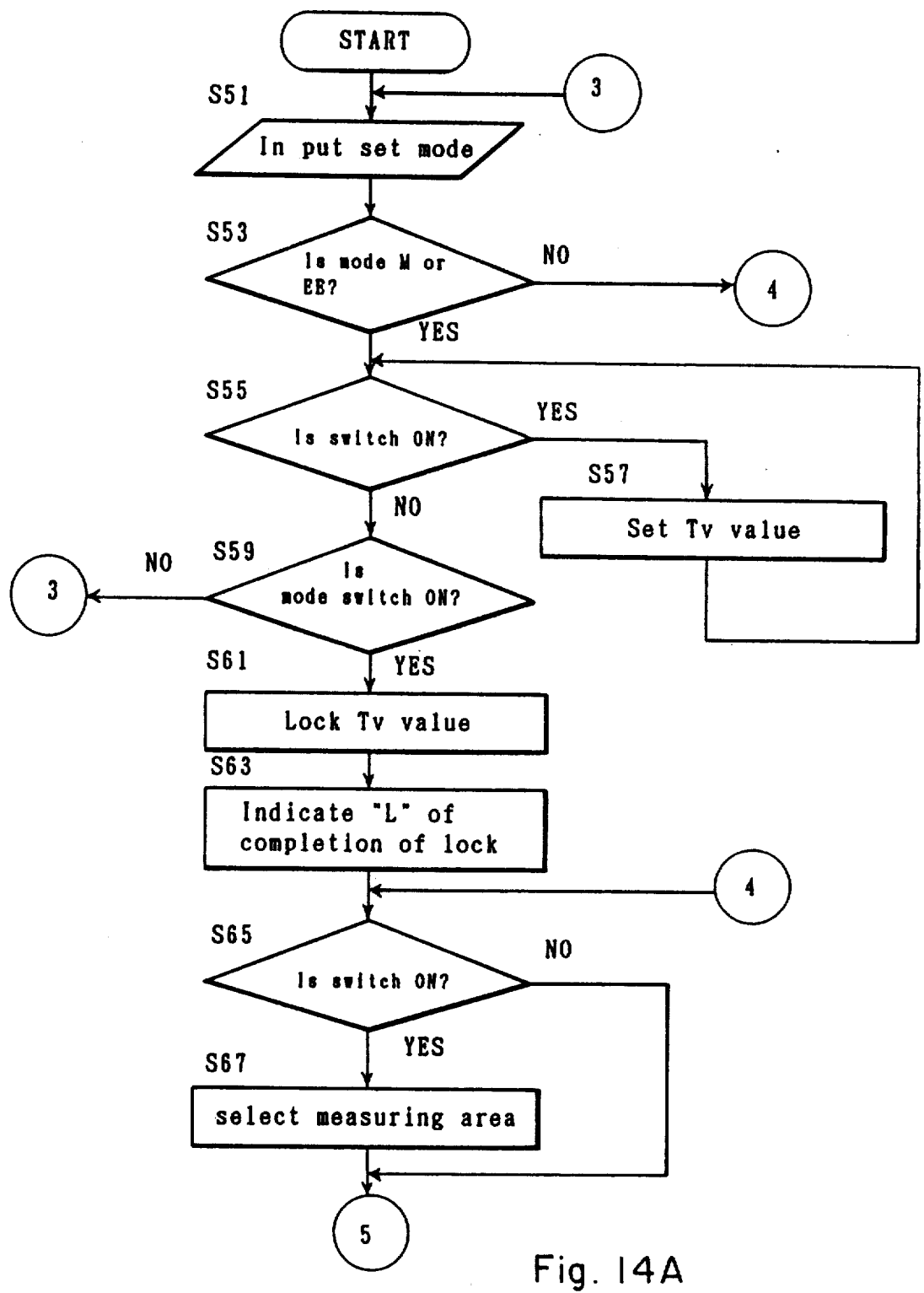
FIGS. 14A and 14B are flow charts of CPU shown in FIG. 10.
Figure 14B:
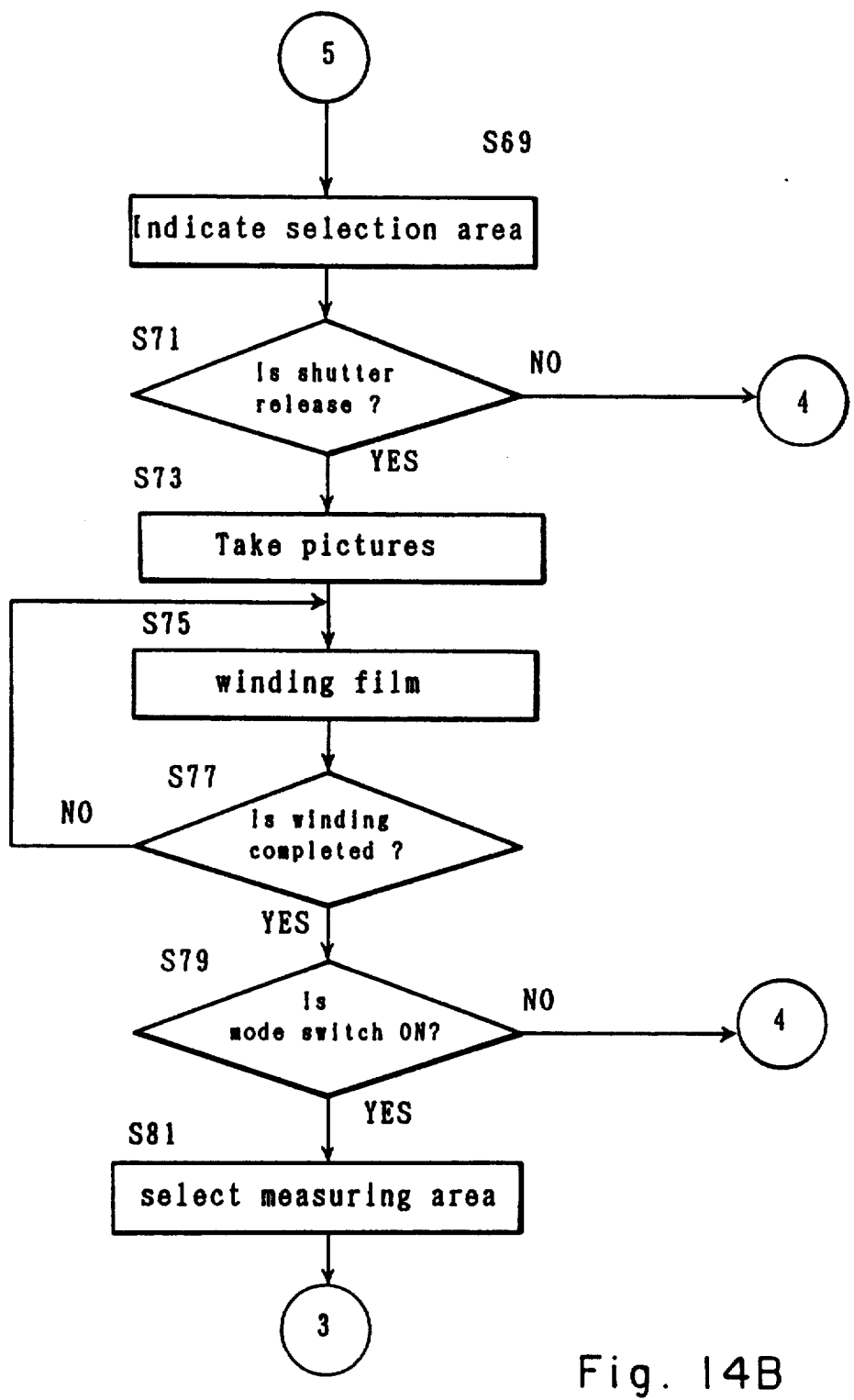

The multi-point object distance measuring device as constructed above operates as follows, as shown in FIGS. 14A and 14B (see also FIGS. 15A-15E and FIGS. 8A-8D).

The CPU 35 in which the associated program is stored performs the stored program.

In a sub-routine of the program, first, the memory which is set by the mode switch portion 30 and the switching switch 32 and which is stored in the memory of the CPU 35 is input, so that whether the mode is the manual mode (M) or the shutter priority mode (EE) is checked (steps S51 and S53).

If the set mode is the manual mode or the shutter priority mode, the CPU 35 judges whether switching switch 32 is solely actuated. That is, whether the switching portion 32 slides in the direction of S or R, shown in FIG. 11A is checked (step S55). After the slide operation is completed, the modification and setting of the shutter speed (Tv) is performed (step S57).

The CPU 35 judges whether the mode switch portion 30 is ON. That is, whether the mode switch portion 30 shown in FIG. 11A is slided toward the P side is checked (step S59). During the operations from step S51 to step S59, the photographing mode of the camera and the operation of the switching portion 32 and the mode switch portion 30 are continuously monitored.

Figure 15A:
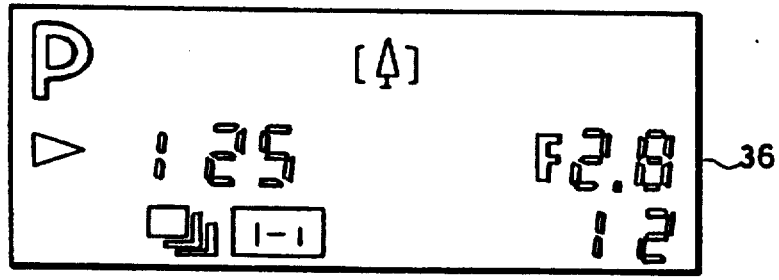
FIG. 15A is a schematic view showing an example of an indication of an external display when a programmed mode is selected in a multi-point object distance measuring camera according to the present invention.
Figure 15B:
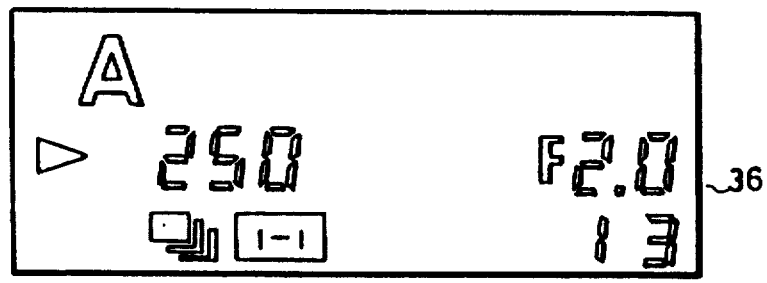
FIGS. 15B and 15C are views similar ti FIG 15A when a shutter priority mode is selected; and, FIGS. 15D and 15E are views similar to FIG. 15A when a manual mode is selected.
Figure 15C:
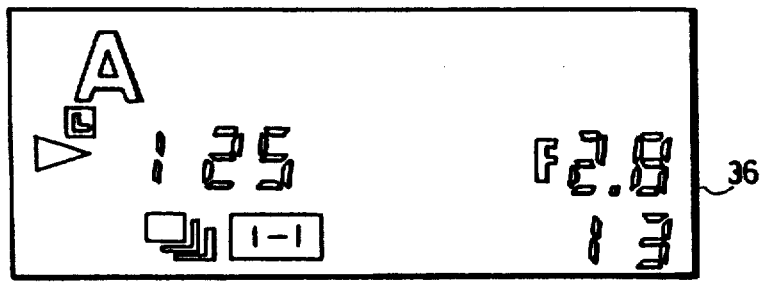

If the actuation of the mode switch portion 30 is detected at step S59, the CPU 35 locks the presently set shutter speed, so that the external display 36 indicates "L" which means the completion of the locking operation through the driver 17, as shown in FIG. 15C (steps S61 and S63).

After that, the CPU 35 checks whether the switching portion 32 is solely actuated. That is, the switching switch 32 shown in FIG. 11A slides toward the R side or S side is checked. This check is also performed at step S65, when the mode is neither the program mode nor the shutter priority mode at step S53, i.e. when the mode is either the manual mode or the diaphragm priority mode. If the switching switch 34 is actuated at step S65, the selection of the measuring area and the display of the selected measuring area are performed at steps S67 and S69. The display is performed by the indicating member 8 through the driver 37.

After that, the CPU 35 checks whether the release button 41 is pushed down. If the release button 41 is pushed down by a half step, the focusing is effected for the object in the selected measuring area 20a, 20b or 20c to perform the arithmetic operation of the brightness and the exposure in order to detect the shutter speed and the diaphragm value (steps S71 and S73). If the release button 41 is pushed down by a half step to make the object distance measuring switch 9 ON, the control proceeds to a flow chart similar to the flow chart shown in FIG. 9 to perform the selection of the measuring area, the drive of the displaying element of the selected measuring area and the focus control.

When the exposure is completed, one frame of film is automatically wound (steps S75 and S77). After that, whether the mode switch 10 is actuated is checked again. If the mode switch 10 is actuated, the display of "L" which indicates the completion of the lock at step S63 disappears, so that the shutter speed can be selected by the switching switch portion 32 (steps S79 and S81).

The operations of the multi-point object distance measuring apparatus are summarized as follows.

In a multi-point object distance measuring apparatus shown in FIGS. 11A and 11B, when the diaphragm on the lens side is in the auto mode, if a photographer slides the switching portion 42 toward the R side or the S side while keeping the mode switch 30 on the P side, the mode is successively changed to the program modes (plurality) and the shutter priority mode in accordance with the sliding operation of the switching switch 32.

FIGS. 15A through 15E show display modes of the external display 36. FIG. 15A shows a display when the program mode (P) is selected, by way of an example. When the program mode is selected, the letter "P" appears. In FIG. 15A, shutter speed is 1/125 second, diaphragm value is F2.8, and the number of frame of film is 12. FIG. 15A also indicates that the camera is under the condition of the multi-point object distance measurement and a continuous photographing mode.

If the switching switch portion 32 is moved in the direction of R or S in the state of the program mode, the measuring area is selected in accordance with the sliding operation. Namely, if the switch portion 32 slides toward R, the measuring areas 20a, 20b, 20c, 20a, . . . are selected in this order. Simultaneously, the indicating elements 8a, 8b, 8c, 8a, . . . are made On in this order to indicate the selected measuring areas. On the contrary, if the switch portion 32 slides toward S, the measuring areas to be selected and the corresponding indicating elements appear in the reversed order.

When the shutter priority mode is selected, the external display 36 indicates the letter "A", as shown in FIGS. 15B and 15C. In FIG. 15B, the shutter speed is 1/250 second, the diaphragm value is F2.0, and the number of frame of film is 13. FIG. 15B also indicates that the camera is under the condition of the multi-point object distance measurement and a continuous photographing mode. In the selection of the shutter priority mode, the shutter speed can be modified by a single operation of the switching portion 32. In this state, if the mode switch portion 30 is shifted toward the direction P in FIG. 11A, the set shutter speed is locked, so that the external display 36 indicates "L" which means that the shutter speed is locked, as shown in FIG. 15C. After that, when the switching portion 32 is actuated, a desired measuring area can be selected. FIG. 15C shows a display when the mode switch portion 30 slides after the shutter speed is set to be 1/125 second.

Figure 15D:
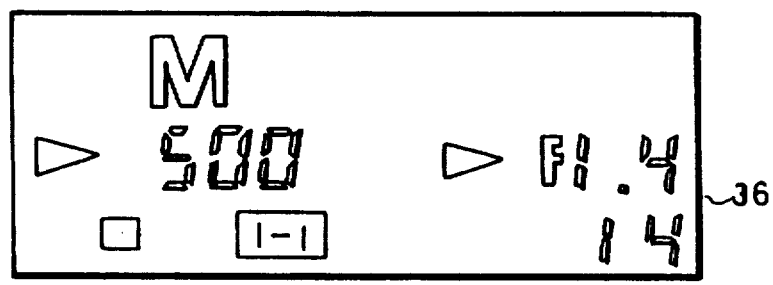
Figure 15E:
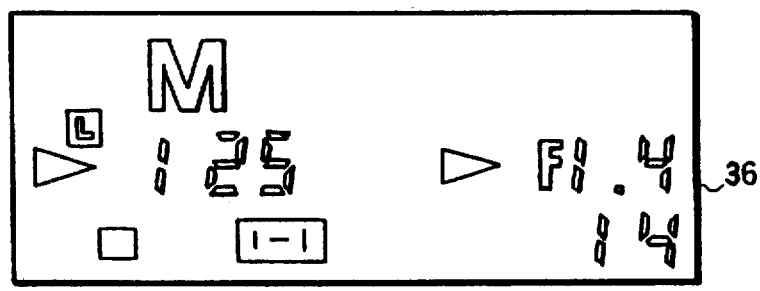

In the manual position of the diaphragm on the lens side, when the mode switch 30 is actuated, the mode is successively changed to the diaphragm priority mode and the manual mode. When the manual mode is selected, the letter "M" appears in the external display 36, as shown in FIGS. 15D and 15E. In FIG. 15D, the shutter speed is 1/500 second, the diaphragm value is F1.4, and the number of frame of film is 14. FIG. 15D also indicates that the camera is under the condition of the multi-point object distance measurement and a single photographing mode. Also in the selection of the manual mode, the setting of the shutter speed can be modified by the single operation of the switching switch portion 32, similarly to the case of the shutter priority mode mentioned above. Namely, if the mode switch portion 30 is shifted in the direction P in FIG. 11A, the presently set shutter speed is locked, so that the letter "L" appears in the display to indicate that the shutter speed is locked. Consequently, a desired measuring area can be selected by the operation of the switching switch portion 32. FIG. 15E shows a display when the mode switch portion 30 slides after the shutter speed is set to be 1/125 second.

The selected measuring areas 20a, 20b and 20c are indicated by the corresponding indicating elements shown in FIG. 8A which are repeatedly made ON and OFF at a relatively long interval, as mentioned before. For instance, when the measuring area 20a is selected, the indicating element 8a is made ON and OFF at a cycle of about 2-3 Hz and when the measuring area 20c is selected, the indicating element 8c is made ON and OFF at the same cycle.

When the release button 41 is pushed down by a half step, the focusing is effected for the object in the selected measuring area 20a, 20b or 20c, as mentioned before. If no focusing can be effected for the object in the selected measuring area, the indicating element 8a, 8b or 8c corresponding to the selected measuring area is made ON and OFF at a relatively short interval of time (about 10 Hz cycle). If the focusing is effected for the object in the selected measuring area, the corresponding indicating element 8a, 8b or 8c is continuously lightened. For instance, when the measuring area 20a is selected, and if no focusing is effected for the object in the measuring area 20a as a result of the focus control, the indicating element 8a is made ON and OFF at a relatively short cycle of 10 Hz. On the contrary, if the focusing is effected, the indicating element 8a is continuously lightened.

A photographer can change the locked shutter speed in the shutter priority mode and the manual mode, by reshifting the mode switch portion 30 in the direction P in FIG. 11A. As a result, the lock of the shutter speed is released, so that the letter "L" which indicates that the shutter speed is locked disappears. Ather that, the shutter speed can be optionally selected by the operation of the switching portion 32.

As can be understood from the foregoing, a photographer can perform setting of modes, setting of photographing data, such as a shutter speed, selection of the object distance measuring areas by operating the two existing operating members while viewing the selected measuring area through the finder. Also, the photographer can easily and visibly confirm the state of focus in the selected measuring area.

It should be appreciated that the present invention is not limited to the illustrated embodiments mentioned above. For instance, although in the illustrated embodiment, when no focusing can be effected for an object in the selected measuring area, a corresponding indicating element is discontinuously lightened at a relatively quick cycle, it is also possible to turn the indicating element OFF instead. This alternative can simplify the program.

Furthermore, although in the illustrated embodiment, the measuring areas selected by a photographer, the state of focus including the impossibility of focusing in the selected measuring areas is indicated by the indicating elements, the indicating elements can be replaced with acoustic elements 29 which change the frequency thereof or the cycle of the generation of sound thereof or make a composite sound. In addition, it is also possible to use the indicating elements 8 and the acoustic elements 29 in combination.

I claim:

1. A focus indicating apparatus of an automatic focusing camera, comprising a plurality of object distance measuring areas, object distance measuring means for detecting the amount of defocus or an object distance of objects in said object distance measuring areas, and focusing means for selecting the one of said object distance measuring areas including an object to be focused, in accordance with the object distance data or defocus data detected by said object distance measuring means and a predetermined algorithm to effect focusing for the object in said selected object distance measuring area, a plurality of indicating means corresponding to said object distance measuring areas and indication control means for driving the indicating means corresponding to said selected object distance measuring area, said indicating means comprising indicating elements located directly below said associated object distance measuring areas in a finder field of view.

2. A focus indicating apparatus according to claim 1, wherein each of said indicating means comprises an optical indicating element.

3. A focus indicating apparatus according to claim 2, further comprising object distance measuring frames corresponding to said object distance measuring areas in a finder field of view of the camera, said indicating elements located to correspond to said associated object distance measuring frames.

4. A focus indicating apparatus according to claim 3, wherein said object distance measuring areas are located in a generally H-shaped arrangement in the finder field of view.

5. A focus indicating apparatus according to claim 4, wherein said indication control means continuously or discontinuously lights said indicating elements corresponding to said selected object distance measuring areas.

6. A focus indicating apparatus according to claim 4, wherein said indication control means continuously or discontinuously lights the indicating element corresponding to said selected object distance measuring area when the focusing is completed for an object in said selected object distance measuring area.

7. A focus indicating apparatus according to claim 4, wherein said indicating elements have different operational forms, so that said selected object distance measuring area and the completion of focus are indicated by said different operational forms of the corresponding indicating elements.

8. A focus indicating apparatus according to claim 7, wherein said different operational forms of said indicating elements include continuous lighting and discontinuous lighting.

9. A focus indicating apparatus according to claim 4, wherein said indicating elements have different operational forms, so that the selected object distance measuring area, the completion of focus and the impossibility of focusing are indicated by said different operational modes of said corresponding indicating elements.

10. A focus indicating apparatus according to claim 9, wherein said different operational modes of said indicating elements include continuous lighting and discontinuous lighting at different cycles.

11. A focus indicating apparatus according to claim 9, wherein said different operational modes of the indicating elements include discontinuous lighting, continuous lighting and OFF.

12. A focus indicating apparatus according to claim 1, wherein each of said indicating means comprises an optical indicating element and at least one acoustic element.

13. A focus indicating apparatus according to claim 1, wherein each of said indicating means comprises at least one acoustic element.

14. A focus indicating apparatus according to claim 12, wherein said indication control means drives said indicating elements corresponding to said selected object distance measuring areas in a first form, drives said indicating elements and said acoustic elements in a second form and at a first tone or first frequency when the focusing is completed, respectively, and drives said indicating elements and said acoustic elements in a third form and at a second tone or second frequency when no focusing can be effected for the object in said selected object distance measuring area, respectively.

15. A focus indicating apparatus according to claim 14, wherein said first form is a discontinuous lighting at a first frequency.

16. A focus indicating apparatus according to claim 14, wherein said second form is a continuous lighting.

17. A focus indicating apparatus according to claim 14, wherein said third form is a discontinuous lighting at a second frequency.

18. A focus apparatus according to claim 14, wherein said first and second forms include discontinuous or continuous lighting and said third form includes turning said indicating elements OFF.

19. A focus indicating apparatus of an automatic focusing camera, comprising a plurality of object distance measuring areas, selecting means for selecting a desired object distance measuring area, object distance measuring means for detecting the object distance of an object in said selected object distance measuring area, driving means for driving a focusing lens of the camera to a focus position in accordance with the object distance data from said object distance measuring means, focus judging means for detecting whether focusing can be effected for the object in the selected object distance measuring area, indicating members corresponding to said object distance measuring areas, and indication control means for driving said indicating members corresponding to said selected object distance measuring area, said indicating members are located directly below said associated object distance measuring areas in the finder field of view.

20. A focus indicating apparatus of an automatic focusing camera, comprising a plurality of object distance measuring areas, selecting means for selecting a desired object distance measuring area, object distance measuring means for detecting the amount of defocus of an object in said selected object distance measuring area, driving means for driving a focusing lens to a focus position in accordance with the defocus data from said object distance measuring means, focus judging means for detecting whether focusing can be effected for the object in said selected object distance measuring area, indicating members corresponding to said object distance measuring areas, indication control means for driving said indicating members corresponding to said selected object distance measuring area, said indicating members are located directly below said associated object distance measuring areas in the finder field of view.

21. A focus indicating apparatus according to claim 20, wherein each of said indicating members comprises an optical indicating element.

22. A focus indicating apparatus according to claim 21, further comprising object distance measuring frames corresponding to said object distance measuring areas in a finder field of view of the camera, so that said indicating elements are located to correspond to said associated object distance measuring frames.

23. A focus indicating apparatus according to claim 22, wherein said object distance measuring areas are located in a generally H-shaped arrangement in the finder field of view.

24. A focus indicating apparatus according to claim 23, wherein said indication control means continuously or discontinuously lights said indicating elements corresponding to said selected object distance measuring areas.

25. A focus indicating apparatus according to claim 23, wherein said indication control means continuously or discontinuously lightens said indicating elements corresponding to said selected object distance measuring areas when the focusing is completed for an object in said selected object distance measuring area.

26. A focus indicating apparatus according to claim 23, wherein said indicating elements have different operational forms, so that the selection of an object distance measuring area and the completion of focusing are indicated by said different operational forms of said corresponding indicating elements.

27. A focus indicating apparatus according to claim 26, wherein said different operational forms of said indicating elements include continuous lighting and discontinuous lightening thereof.

28. A focus indicating apparatus according to claim 23, wherein said indicating elements have different operational forms, so that the selection of an object distance measuring area, the completion of focus and said impossibility of focusing are indicated by said different operational forms of said corresponding indicating elements.

29. A focus indicating apparatus according to claim 28, wherein said different operational forms of said indicating elements include continuous lighting and discontinuous lighting at different cycles.

30. A focus indicating apparatus according to claim 29, wherein said different operational forms of said indicating elements include discontinuous lighting, continuous lighting and turning the light OFF.

31. A focus indicating apparatus according to claim 20, wherein each of said indicating members comprises an optical indicating element and at least one acoustic element.

32. A focus indicating apparatus according to claim 31, wherein said indication control means drives said indicating elements corresponding to said selected object distance measuring areas in a first form, drives said indicating elements and said acoustic elements in a second form and at a first tone or first frequency when the focusing is completed, and drives said indicating elements and said acoustic elements in a third form and at a second tone or second frequency when no focusing can be effected for the object in said selected object distance measuring area,.

33. A focus indicating apparatus according to claim 32, wherein said first form is a discontinuous lighting at a first frequency.

34. A focus indicating apparatus according to claim 33, wherein said second form is a continuous lighting.

35. A focus indicating apparatus according to claim 33, wherein said third form is a discontinuous lighting at a second frequency.

36. A focus indicating apparatus according to claim 33, wherein said first and second forms include discontinuous or continuous lighting and said third form includes turning said indicating elements OFF.

37. In a multi-point object distance measuring camera, comprising a plurality of object distance measuring areas, focusing means for focusing an object in an object distance measuring area selected among said object distance measuring areas, and a mode selecting member and a switching member which, in combination, set photographing modes, such as a program mode, a shutter priority mode, a diaphragm priority mode, and a manual mode, so that manual setting of photographing data, such as a shutter speed, can be effected by a single operation of the switching member at specific photographing modes, and an object distance measuring area selecting means for selecting a desired object distance measuring area among said object distance measuring areas by the single operation of said switching member at a photographic mode other than said specific modes set by said switching member and mode setting member.

38. A multi-point object distance measuring camera according to claim 37, wherein said object distance measuring area selecting means stores photographing data set by said switching member when said mode selecting member is solely actuated at said specific modes, so that said object distance measuring area can be selected by the single operation of said switching member thereafter.

39. A multi-point object distance measuring camera according to claim 37, wherein said object distance measuring area selecting means makes it impossible to reselect said object distance measuring area and makes it possible to set the photographing data by the operation of said mode selecting member after the selection of said object distance measuring area.

40. A multi-point object distance measuring camera according to claim 39, wherein said specific photographing modes are said shutter priority mode and said manual mode.

41. A multi-point object distance measuring camera according to claim 37, further comprising indicating members corresponding to said object distance measuring areas.

42. A multi-point object distance measuring camera according to claim 41, wherein each of said indicating members comprises an optical indicating element.

43. A multi-point object distance measuring camera according to claim 42, further comprising object distance measuring frames corresponding to said object distance measuring areas in a finder field of view of the camera, so that said indicating elements are located to correspond to said associated object distance measuring frames.

44. A multi-point object distance measuring camera according to claim 43, wherein the number of said object distance measuring areas is three, which are located in a generally H-shaped arrangement in the finder field of view, and wherein said indicating elements are located directly below said associated object distance measuring areas in the finder field of view.

45. A multi-point object distance measuring camera according to claim 43, and further including indication control means for continuously or discontinuously lighting said indicating elements corresponding to said selected object distance measuring areas.

46. A multi-point object distance measuring camera according to claim 43, and further including indication control means for continuously or discontinuously lighting said indicating elements corresponding to said selected object distance measuring area.

47. A multi-point object distance measuring camera according to claim 43, wherein said indicating elements have different operational forms, so that said selected object distance measuring area and the completion of focusing are indicated by said different operational forms of said corresponding indicating elements.

48. A multi-point object distance measuring camera according to claim 47, wherein said different operational forms of said indicating elements include continuous lighting and discontinuous lighting of said elements.

49. A multi-point object distance measuring camera according to claim 43, wherein said indicating elements have different operational forms, so that said selected object distance measuring area, the completion of focusing and the impossibility of focusing are indicated by said different operational forms of the corresponding said indicating elements.

50. A multi-point object distance measuring camera according to claim 49, wherein said different operational forms of the indicating elements include continuous lighting and discontinuous lighting at different rates.

51. A multi-point object distance measuring camera according to claim 49, wherein the different operational forms of said indicating elements include discontinuous lightening, continuous lightening and turning the light OFF.

52. A multi-point object distance measuring camera according to claim 49, wherein each of said indicating elements comprises an optical indicating element and at least one acoustic element.

53. A multi-point object distance measuring camera according to claim 52, wherein said acoustic element is provided on a camera body.

54. A multi-point object distance measuring camera according to claim 53, further including indication control means for driving the indicating elements corresponding to said selected object distance measuring areas in a first form, driving said indicating elements and said acoustic elements in a second form and at a first tone or first frequency when the focusing is completed, and driving said indicating elements and said acoustic elements in a third form and at a second tone or second frequency when no focusing can be effected for the object in said selected object distance measuring area.

55. A multi-point object distance measuring camera according to claim 54, wherein said first form is a discontinuous lighting at a first frequency.

56. A multi-point object distance measuring camera according to claim 54, wherein said second form is a continuous lighting.

57. A multi-point object distance measuring camera according to claim 54, wherein said third form is a discontinuous lighting at a second frequency.

58. A multi-point object distance measuring camera according to claim 54, wherein said first and second forms include discontinuous or continuous lighting and said third form includes turning the indicating elements OFF.

59. A focus indicating apparatus of an automatic focusing camera according to claim 19, wherein said object distance measuring areas are located in a generally H-shaped arrangement in the finder field of view.

* * * * *

UNITED STATES PATENT AND TRADEMARK OFFICE
CERTIFICATE OF CORRECTION

PATENT NO. : 4,994,843
DATED : February 19, 1991
INVENTOR(S) : Toshiyuki KITAZAWA It is certified that error appears in the above-indentified patent and that said Letters Patent is hereby corrected as shown below:

On the cover page, at section [57], line 13 under Abstract, change "area" to ---areas---.

At column 17, line 10 (claim 28, line 4), change "said" to ---the---.

At column 19, line 6 (claim 51, line 4), change "lightening" (both occurrences) to ---lighting---.

Signed and Sealed this

Fourteenth Day of March, 1995

Attest:

BRUCE LEHMAN

Attesting Officer

Commissioner of Patents and Trademarks